United States Patent [19]

Partridge

[11] Patent Number: 5,776,325
[45] Date of Patent: Jul. 7, 1998

[54] ION TRANSPORT APPARATUS AND PROCESS

[75] Inventor: Ashton Cyril Partridge, Stokes Valley, New Zealand

[73] Assignee: Industrial Research Limited, Lower Hutt, New Zealand

[21] Appl. No.: 765,757

[22] PCT Filed: Jul. 6, 1995

[86] PCT No.: PCT/NZ95/00060

§ 371 Date: Jan. 6, 1997

§ 102(e) Date: Jan. 6, 1997

[87] PCT Pub. No.: WO96/01681

PCT Pub. Date: Jan. 25, 1996

[30] Foreign Application Priority Data

Jul. 7, 1994 [NZ] New Zealand ............... 260960

[51] Int. Cl.$^6$ .................................................. B01D 61/44
[52] U.S. Cl. ............... 204/518; 204/543; 204/544; 204/627
[58] Field of Search ................. 204/518, 543, 204/544, 627

[56] References Cited

U.S. PATENT DOCUMENTS

| | | | |
|---|---|---|---|
| 4,585,536 | 4/1986 | Puetter et al. | 204/630 |
| 5,043,048 | 8/1991 | Muralidhara | 204/518 |
| 5,064,515 | 11/1991 | Harapanahalli | 204/518 |
| 5,085,749 | 2/1992 | Grimshaw et al. | 204/541 |
| 5,094,732 | 3/1992 | Oldani et al. | 204/182.4 |

FOREIGN PATENT DOCUMENTS 2041406  9/1980  United Kingdom.

*Primary Examiner*—Arun S. Phasge
*Attorney, Agent, or Firm*—Amy E. Mandragouras; Lawrence E. Monks; Lahive & Cockfield, LLP

[57] ABSTRACT

The invention relates to a method and apparatus for inducing the mono-directional transport of ions across a conducting polymer membrane which separates electrolyte solutions, by creating a potential gradient across the conducting polymer membrane.

24 Claims, 10 Drawing Sheets

ION TRANSPORT APPARATUS AND PROCESS

This application is a 371 continuation of PCT/NZ95/0006 filed on Jul. 6, 1995.

TECHNICAL FIELD

The invention relates to the mono-directional transport of ions through a conducting polymer membrane and to an apparatus for inducing such mono-directional transport.

BACKGROUND ART

Two approaches have been used to apply conducting polymers (CP's) to separation technology. The first involves coating the CP film onto the stationary phase of an ion chromatography medium. Separation was achieved by varying the redox state of the polymer during elution. Using this approach, Deinhammer et. al. (Anal. Chem. 1991, 63, 1884) successfully demonstrated the separation of the adenosine nucleotides, AMP and ATP. The second approach employs CP's as either free standing or composite membranes through which ion transport could be achieved. Transportation of ions was similarly induced by modifying the conductive state of the polymer matrix.

Mirmohseni et. al. (J Intelligent Material Systems and Structures, 1993, 4, 43) demonstrated the transport of $Na^+$ and $K^+$ ions through a free standing membrane of polypyrrole (PPy). The anion employed as the dopant within the membrane was p-toluene sulphonate ($PTS^-$). The experimental setup used comprised a two compartment cell separated by a PPy membrane. A current was applied potentiostatically by a three-electrode system in one of the compartments, using the membrane as the working electrode. Transportation of ions was achieved by oscillating the membrane between anodic and cathodic potentials. The result was the selective transport of $K^+$ ions over $Na^+$, the extent of which depended on the pulse width employed.

Although the process described by Mirmohseni et. al. achieved continuous ion transport through the membrane, transport could not be maximised. The experimental setup dictated that ions absorbed selectively from one compartment of the cell, were desorbed simultaneously into both compartments. A mono-directional flow of ions could not be achieved.

It is therefore an object of the invention to provide a means capable of inducing mono-directional transport of ions through a conducting polymer membrane.

SUMMARY OF THE INVENTION

In broad terms the invention comprises a method of inducing mono-directional transport of ions between electrolyte solutions, the method comprising separating the electrolyte solutions with a conducting polymer membrane and creating a potential gradient across said membrane.

Preferably the potential gradient is created by using the conducting polymer membrane as a shared working electrode.

In broad terms the invention further comprises an apparatus for inducing mono-directional transport of ions between electrolyte solutions separated by a conducting polymer membrane by applying a potential gradient across the polymer membrane.

Preferably the potential gradient through the conducting polymer membrane is achieved by a three electrode system in each solution, the three electrode systems comprising a reference electrode, a counter electrode, and a shared working electrode and wherein the shared working electrode is the polymer membrane separating the solutions.

Preferably the conducting polymer membrane is free-standing.

Preferably the conducting polymer membrane is a composite membrane made of a conducting polymer incorporated into either a non-conductive or conductive media.

Preferably the potential gradient through the conducting polymer membrane remains constant.

Preferably the conducting polymer membrane is selected from polypyrrole, polythiophene, polyacetylene, polyfuran, polyaniline or polyphenylene or derivatives of these.

Preferably the apparatus further includes combination pH probes.

Preferably the electrolyte solutions are constantly stirred.

Preferably the counter electrodes are stainless steel, titanium, gold, platinum or carbon counter electrodes.

Preferably the reference electrode is an Ag/AgCl or SCE electrode.

Preferably the potential gradient across the conducting polymer membrane is varied.

Preferably the potential gradient across the conducting polymer membrane is varied by holding one electrolyte solution at a constant potential and allowing the potential in the other electrolyte solution to vary.

Preferably there are more than two electrolyte solutions each separated by a conducting polymer membrane.

Preferably the potential gradient across the conducting polymer membrane is up to 2400 mV, preferably up to 2000 mV, and more preferably up to 1400 mV.

Preferably the method and/or apparatus is used to remove ions from wine, geothermal bore water, wool scour or sea water.

Preferably the ions transported are cations and are selected from the group consisting of H, Li, Na, K, Rb, Cs, Fr, Be, Mg, Ca, Sr, Ba and Ra.

Preferably the ions transported are anions and are selected from the group consisting of nitrates, sulphates, halides, phosphates, and perchlorates.

BRIEF DESCRIPTION OF THE DRAWINGS

Preferred embodiments are illustrated with reference to the accompanying drawings by way of example. In the drawings.

DETAILED DESCRIPTION OF THE INVENTION

The setup preferably used to induce mono-directional transport of ions between electrolyte solutions comprises a two compartment cell separated by a conducting polymer membrane. The ions transported may be mono or divalent cations or anions as is known in the art. For example typical ions transportable by the method or apparatus of the invention include H, Li, Na, K, Rb, Cs, Fr, Be, Mg, Ca, Sr, Ba, Ra and the nitrates, sulphates, halides, phosphates and perchlorates. Of the halides, the most important are the chlorides, fluorides and iodides in commercial applications although the remaining halides may also be transported.

Although the transport of anions was not demonstrated experimentally, it is known that they are expelled and incorporated into a conducting polymer membrane in a similar fashion to that of cations. As portrayed in the mechanism (FIG. 1, a and c), if the anion is small and mobile, reduction of the membrane (a) leads to expulsion, whereas oxidation (c) leads to incorporation. Transport of anions across a conducting polymer membrane has been demonstrated by Mirmohseni, A Price, W E and Wallace G G (in print) for a number of sulphonated compounds with varying mobilities.

Preferably the conducting polymers used in the membrane include polypyrrole, polythiophene, polyacetylene, polyfuran, polyaniline and polyphenylene or derivatives of these. However other conducting polymers may also be used as will be known in the art. The membranes may be chemically or electrochemically grown and may be free-standing or composites when incorporated into either a non-conductive or conductive media as will again be known in the art.

Figure 1:
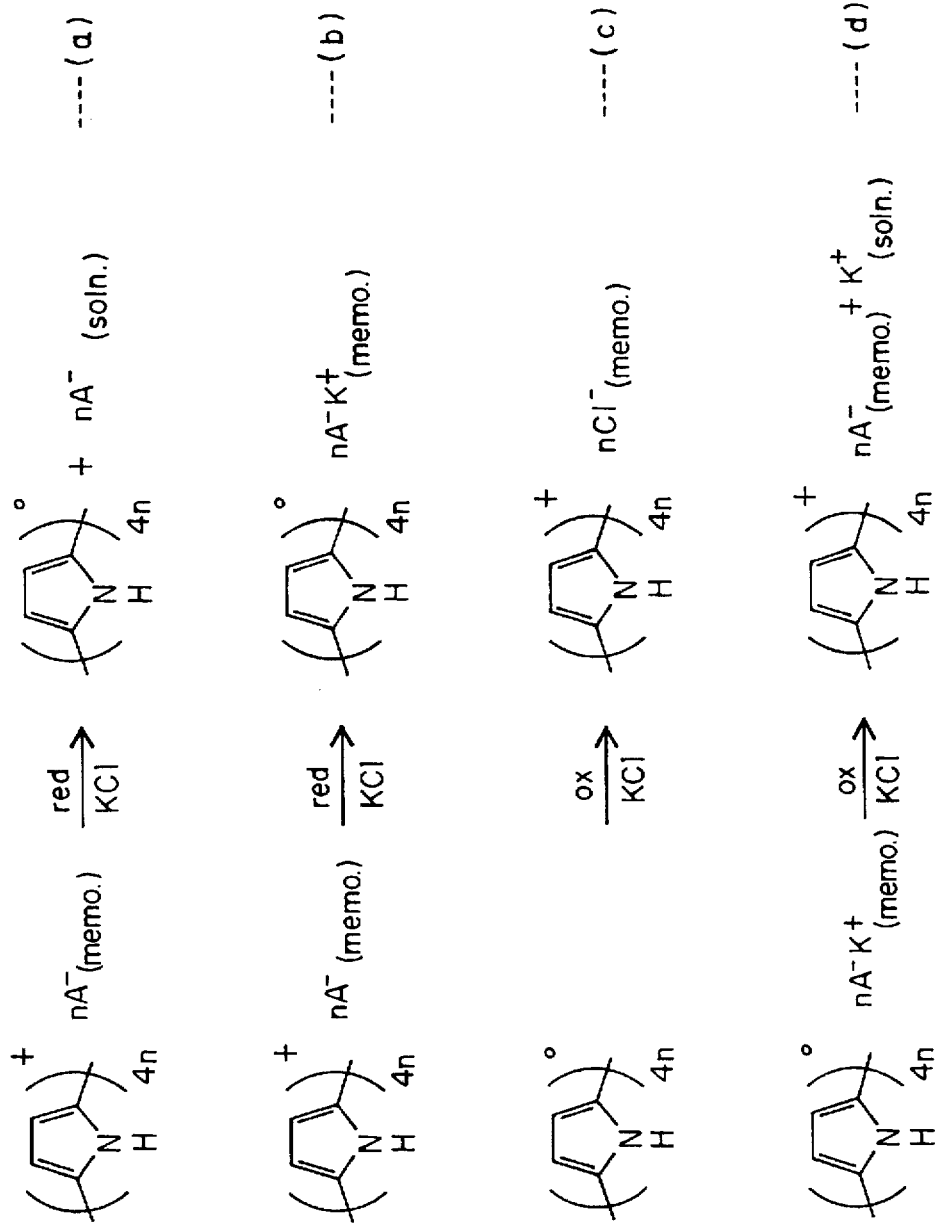
FIG. 1 shows the mechanisms for the reduction (a and b) and oxidation (c and d) of a polypyrrole film.

While polypyrrole (PPy) membranes have generally been used in the examples (see Examples 3–10 herein) any of the membranes referred to previously could be used to equal effect as will be known in the art. All the membranes listed operate via the same conduction mechanism as is shown in FIG. 1 and would thus be viable options for use in the method or apparatus of the present invention.

Ion transport through the membrane is induced by applying a potential gradient across the conducting polymer matrix. Preferably potentials are created on either side of the membrane using three-electrode setups in each compartment comprising reference electrode, counter electrode, and the conducting polymer membrane as a common, or shared, working electrode. In this way potentials are applied simultaneously to the conducting polymer/electrolyte solution interfaces on either side of the polymer membrane to create the potential gradient across the membrane. As will be apparent to a person skilled in the art the invention should not be seen to be limited to a two compartment cell however.

Usually complementary potentials will be created on either side of the membrane. Such potentials may range between about +1200 mV and -1200 mV creating a potential gradient of 2400 mV across the membrane. While creating complementary potentials across the membrane (eg +400 mV/-400 mV) will induce the transport of ions through the membrane, movement of ions will occur so long as a potential gradient is formed across the membrane. For example a -200 mV/+400 mV (600 mV gradient) combination will also induce mono-directional transport as will potential gradients such as 0 mV/±700 mV (700 mV gradient); -100 mV/+400 mV (500 mV gradient) or -200 mV/+700 mV (900 mV gradient). Creating such potentials will therefore lead to the creation of an "anodic" and a "cathodic" compartment. The essential requirement is that a potential gradient across the polymer membrane is created.

The potentials created on either side of the polymer membrane are preferably held at a constant value and thus the potential gradient across the membrane is also preferably constant. However mono-directional transport of ions will occur if one side of the cell setup is allowed to fluctuate. In such a situation the other side of the setup must however be held at a constant potential. In this way a master/slave-type system (as is described in more detail hereinafter—see FIG. 8) is created which allows greater flexibility in the use of the system.

Optimisation of the potential across the conducting polymer membrane to maximise ion transport will depend on the particular application to which the system has been applied, and on the electrolyte solutions used. Such factors will be readily discernable to a person skilled in the art and optimisation of transport will be a matter of testing only.

FIG. 1 summarises the results of reducing and oxidising the polymer membrane. Conventionally prepared polypyrrole (PPy) in its conductive state contains positive charges dispersed throughout the matrix. Each charge is associated with a negatively charged dopant ion species, and charge density is in the order of one ion pair to every 4 pyrrole monomer units. Reduction of the polymer effectively neutralises the positive charge within the matrix, and renders the polymer non-conductive. Neutrality of the dopant anion, A$^-$, is achieved by either desorption of the dopant into solution (1a), or absorption of a cation into the polymer (1b). Conversely, oxidation of the reduced polymer results in either absorption of anions into the matrix (1c) or desorption of cations (1d) into solution, and reintroduces conductivity into the matrix. The prevailing mechanism largely depends upon the mobility of the dopant ion within the polymer. For example the use of PTS$^-$ (p-toluene sulphonate) by Mirmohseni et al (see prev) as the dopant ion would predominantly use the mechanism as shown in FIG. 1b and FIG. 1d. As shown by G G Wallace (Chem. in Britain 1993, 967) PTS$^-$ has a restricted mobility within the PPy matrix. Thus the mechanism of transport during the reduction and oxidation of the membrane would be adsorption (FIG. 1b) and absorption (FIG. 1d). It is this mobility that distinguishes the polymer as having either cation or anion-exchange properties.

Experimental

Chemicals

Pyrrole and p-toluenesulphonic acid sodium salt were obtained from the Aldrich Chemical company. Pyrrole was distilled and stored under nitrogen prior to use. All other reagents were analytical grade. Distilled water was used throughout.

Instruments

A Perkin-Elmer 703 Atomic Absorption spectrometer was used for cation determination.

Cyclic voltammetry (CV) was carried out using a conventional three electrode electrochemical cell with a stainless steel (316) counter electrode, a Ag/AgCl reference electrode and a free standing PPy membrane was the working electrode. The cell comprised one of the compartments used for the transport experiments. Voltammograms were performed on a PAR 173 potentiostat with a 273 interface, and with the aid of the Headstart programme.

The transport experiments of FIGS. 3 to 7 were performed using identical PAR 173 potentiostats.

Membrane preparation

Polypyrrole membranes (8 cm×8 cm) for use in all experiments were prepared in aqueous solutions of pyrrole (0.1M) and p-toluenesulphonic acid sodium salt (0.1M) on stainless steel working electrodes. Electrochemical polymerisation was carried out galvanostatically using an anodic current density of 2.8 mA cm$^{-2}$ for 20 minutes. The electrodes were held in a vertical orientation in order to optimise coverage of the electrode surface and minimise dendritic growth. The membranes were carefully peeled from the electrode surface and washed thoroughly with distilled water. Membranes were stored in distilled water until required. The membrane thickness was approximately 70–80 micrometers.

Electrochemical Ion Transport Cell

Figure 2:
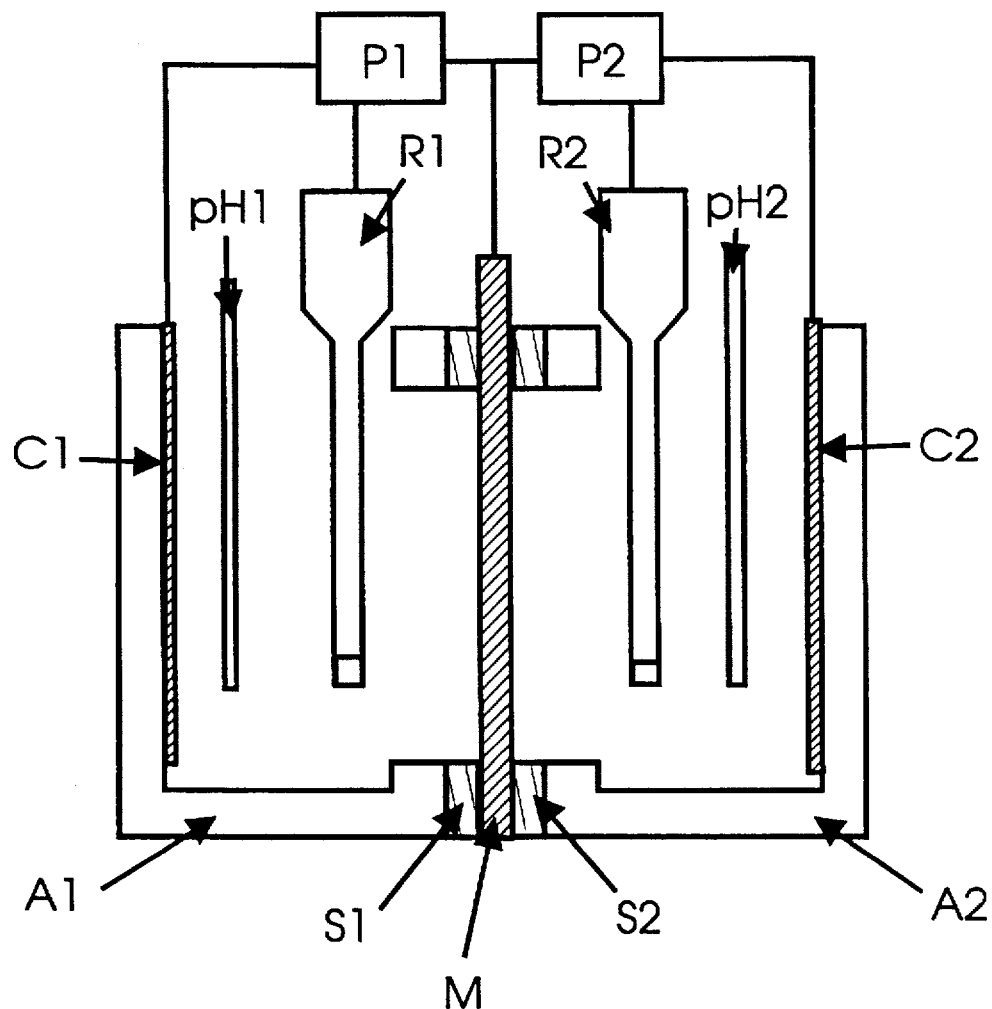
FIG. 2 shows the schematic diagram for the setup of an electrochemical cell of the present invention.

The electrochemical cell used for transport experiments is depicted in FIG. 2. The cell consists of two externally clamped perspex compartments (A1 and A2), each with a capacity of 100 mL and separated by a conducting polymer membrane (M). Rubber gaskets (S1 and S2) were used to seal the cell from leaking. The area of the conducting membrane exposed to the electrolytic solutions contained in the compartments (A1 and A2) was 20 cm$^2$. Each compartment contained a stainless steel counter (C1 and C2) and a reference electrode (R1 and R2). The membrane (M) constituted the common working electrode. In addition, the compartments were separately stirred either mechanically or magnetically. In the mixed ion transport experiments the compartments (A1 and A2) contain combination pH probes (pH1 and pH2). The electrodes in each compartment were separately connected to a PAR 173 potentiostat.

Transport Experiments—FIGS. 3 to 10

Transport was induced through the membrane by simultaneously applying a potential of –400 mV to one side of the cell (referred to as the 'cathodic compartment') and a potential of +400 mV to the other (referred to as the 'anodic compartment'). As the two surfaces of the membrane were different in morphology, the membranes were placed with the side peeled from the electrode facing the cathodic compartment of the cell.

Using the electrochemical ion transport cell described previously and as depicted in FIG. 2, transport experiments were carried out on the chloride salts of the three cations Na$^+$, K$^+$ and Ca$^{2+}$. Initial experiments focused on the individual cations, later experiments looked at the effect of transporting equimolar mixtures of (1) K$^+$ and Na$^+$, and (2) K$^+$ and Ca$^{2+}$. Only during the latter experiments was the pH of each compartment monitored. 0.1M solutions of the ions for transport were placed in the cathodic compartment of the cell, while the anodic compartment contained an electrolytic solution with a different cation. Potentials were applied simultaneously, and the extent of ion transport, into the anodic compartment, determined by periodically removing samples and analysing them by atomic absorption. A fresh membrane was used in each transport system.

Figure 3:
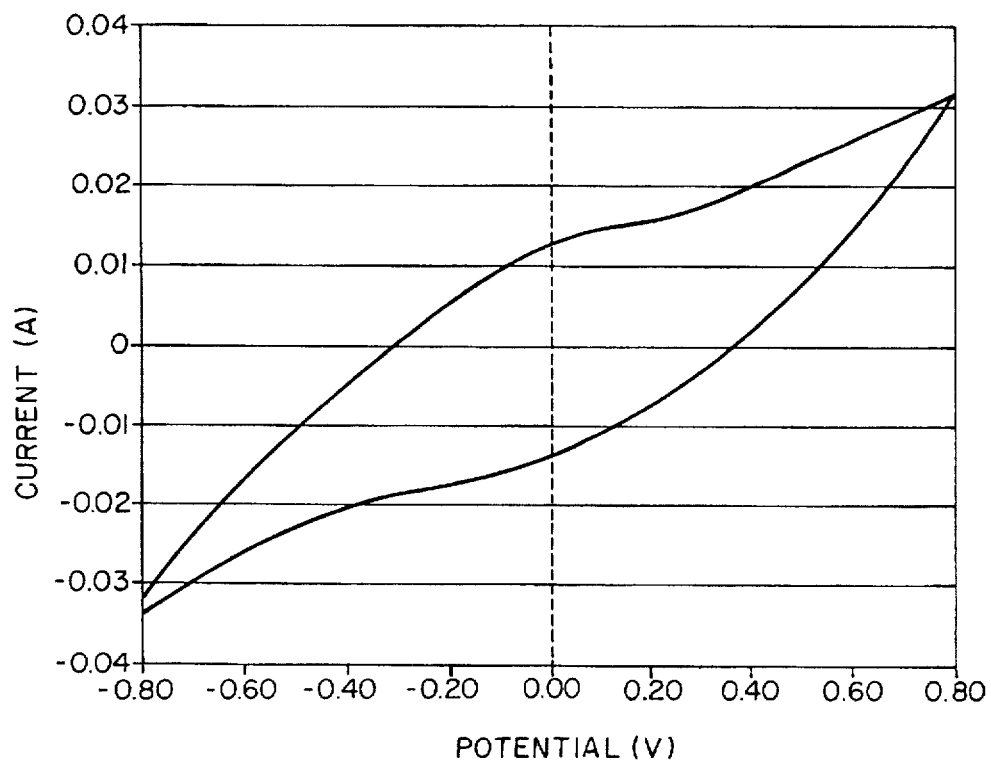
FIG. 3 shows the cyclic voltammogram of a PPy membrane in NaCl.

FIG. 3 depicts the cyclic voltammogram (CV) of a PPy membrane in a 0.1M NaCl solution vs an Ag/AgCl reference electrode. The electrolytic solution was not deaerated prior to commencement of the CV. The scan rate=40 mV/sec. The forward sweep depicts oxidation of the film and corresponds to ion expulsion. The reverse sweep depicts reduction of the film and ion inclusion. The CV indicates that the redox potentials are centred around zero volts verses Ag/AgCl. This is similar to the result obtained by Walton et. al. (Analyst, 1992, 117, 1305) for a PTS$^-$ doped PPy film in an aqueous solution of Et$_4$NPTS. From the CV in FIG. 3 the oxidation/reduction potentials chosen for ion transport were +/–400 mV.

Figure 4:
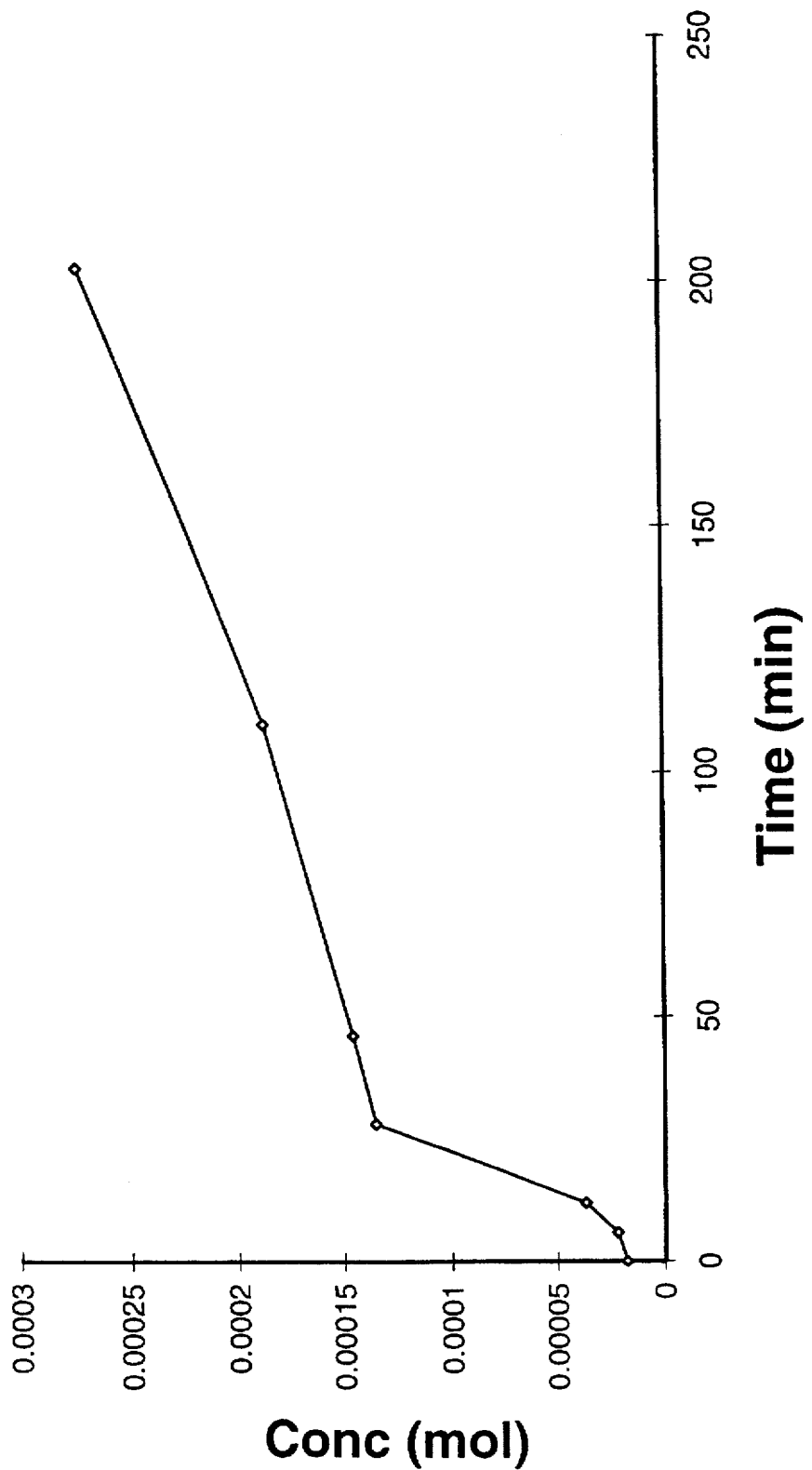
FIG. 4 shows the concentration profile for the single ion transport of $Na^+$ through a PPy membrane.

FIG. 4 shows the concentration profile, measured in the anodic compartment, for the transport of Na$^+$ through the membrane. The concentration of Na$^+$ ions varies from $1\times10^{-6}$M at T=0 to approximately $1.1\times10^{-5}$M at T=200 min. After an initial delay of a few minutes, two transport rates were observed. An initial rapid rate followed by a later slower rate. The initial delay is thought to correspond to the time taken for the ion-depleted membrane to be filled-up with ions, a factor largely dependent on the thickness of the film.

Figure 5:
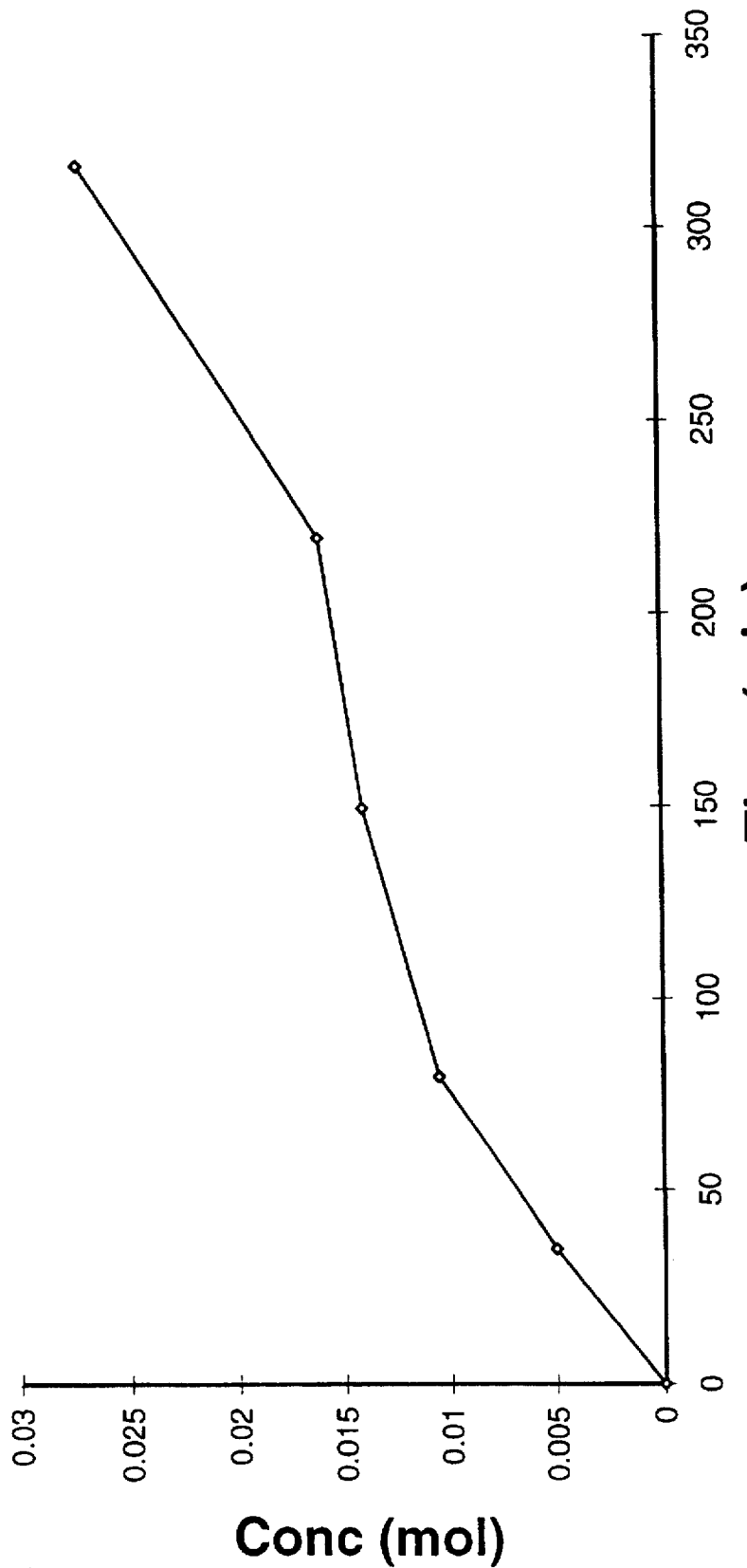
FIG. 5 shows the concentration profile for the single ion transport of $K^+$ through a PPy membrane.

FIG. 5 shows the concentration profile, measured in the anodic compartment for transport of K$^+$ through the membrane. K$^+$ ions show a similar concentration profile to that of Na$^+$ and again shows the two transport rates, although insufficient data points were collected to clearly distinguish between these two rates.

Flux values indicate the quantity of ions (in mol) passing through a one centimeter square portion of membrane every second. A flux value of $0.5\times10^{-8}$ mol /cm$^2$sec for example, would indicate that, for a membrane with a surface area of 20 cm$^2$, every hour 14 mg of K$^+$ ions are transported through. The flux values for single ion transport (Na$^+$, K$^+$) are given in Table 1.

TABLE 1

| Flux Values for K$^+$ and Na$^+$ Single Ion Transport | | |
|---|---|---|
| | K$^+$ (mol/cm$^2$s) | Na$^+$ (mol/cm$^2$s) |
| Initial Values | $1\times10^{-7}$ | $3.5\times10^{-9}$ |
| Later Values | $8\times10^{-8}$ | $9\times10^{-9}$ |

When single ion transport experiments were carried out on Ca$^{2+}$ however, almost no transport through the membrane was observed. After running a single ion experiment on Ca$^{2+}$, as for the single ion K$^+$ experiments, 6 ppm of Ca$^{2+}$ was transported after 5 hours compared with 1200 ppm for K$^+$.

Figure 6:
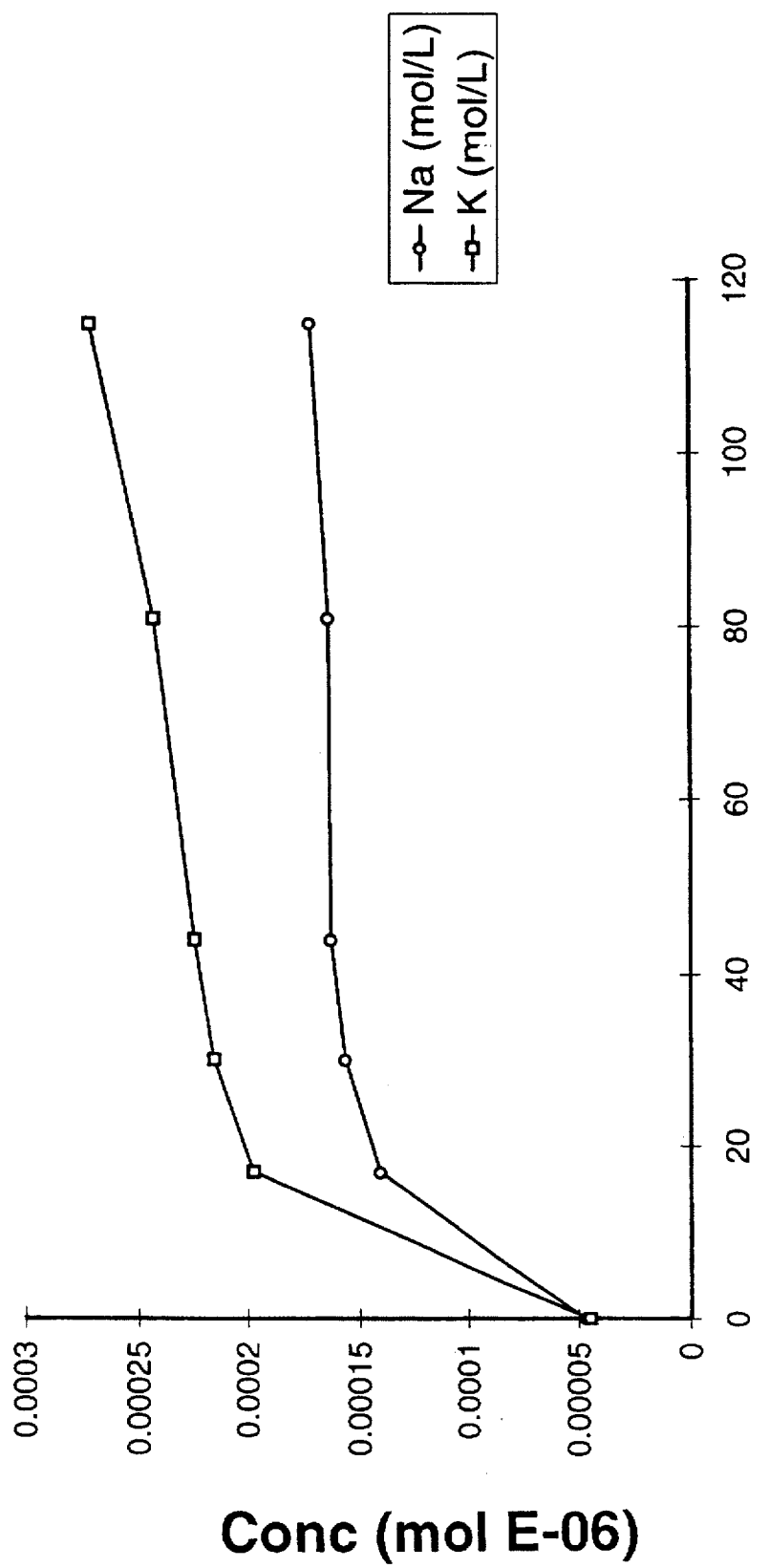
FIG. 6 shows the concentration profile for the transport of an equimolar mixture of $K^+$ and $Na^+$ through the membrane.

FIG. 6 shows the concentration in the anodic and cathodic compartments, for the transport of an equimolar mixture of K$^+$ (0.1M) and Na$^+$ (0.1M) through the membrane. The calculated flux and selectivity factor values ("s") for the mixed experiment (K$^+$/Na$^+$) are given in Table 2. A similar experiment to determine the transport of an equimolar mixture of K$^+$(0.1M) and Ca$^{2+}$(0.1M) through a PPy membrane was also run and the calculated flux and selectivity factor values are given in Table 3. The flux rates are given in terms of the moles of ions transported per square centimeter of polymer per second with the "s" value indicating the competition between the two.

TABLE 2

| Flux and selectivity values for K$^+$/Na$^+$ Transport System | | | |
|---|---|---|---|
| | Flux of K$^+$ (mol/cm$^2$s) | Flux of Na$^+$ (mol/cm$^2$s) | s values (Flux K$^+$/Flux Na$^+$) |
| Initial Values | $4.5\times10^{-9}$ | $3\times10^{-9}$ | 1.5 |
| Later Values | $3.5\times10^{-10}$ | $1\times10^{-9}$ | 3.5 |

TABLE 3

Flux and Selectivity values for $K^+/Ca^{2+}$ transport system

|  | Flux of $K^+$ (mol/cm$^2$s) | Flux of $Ca^{2+}$ (mol/cm$^2$s) | s values (Flux $K^+$/Flux $Ca^{2+}$) |
|---|---|---|---|
| Initial Values | $5 \times 10^{-8}$ | $3 \times 10^{-8}$ | 1.6 |
| Later Values | $4 \times 10^{-9}$ | $2 \times 10^{-9}$ | 2.0 |

As can be seen in FIG. 6 the concentration profiles for the mixed ion transport ($Na^+/K^+$) system measured in the anodic compartment, are similar in shape to those obtained for the single ion transport systems and again show the two transport rates discussed previously.

A comparison of the flux values obtained (Tables 1 and 2) clearly shows that competition occurs between the $K^+$ and $Na^+$ ions as the flux values obtained in the mixed ion systems (Table 2) are substantially lower than the single ion transport systems (Table 1).

Interestingly, in the mixed ion $K^+/Ca^{2+}$ competitive system, significant quantities of $Ca^{2+}$ were transported through the membrane (see Table 3). This was surprising, as (see previously) the single $Ca^{2+}$ ion results indicated the transport of only minute quantities of $Ca^{2+}$ ions. The cooperative effect of transporting $Ca^{2+}$ with $K^+$, due to mixing ions, is not clear. Further investigations are presently under way to investigate this property however, that $Ca^{2+}$ ions may be transported in this manner is clear from the results. This particular finding would be of particular interest to the wine industry as there is a need to remove potassium and calcium during wine production.

Figure 7:
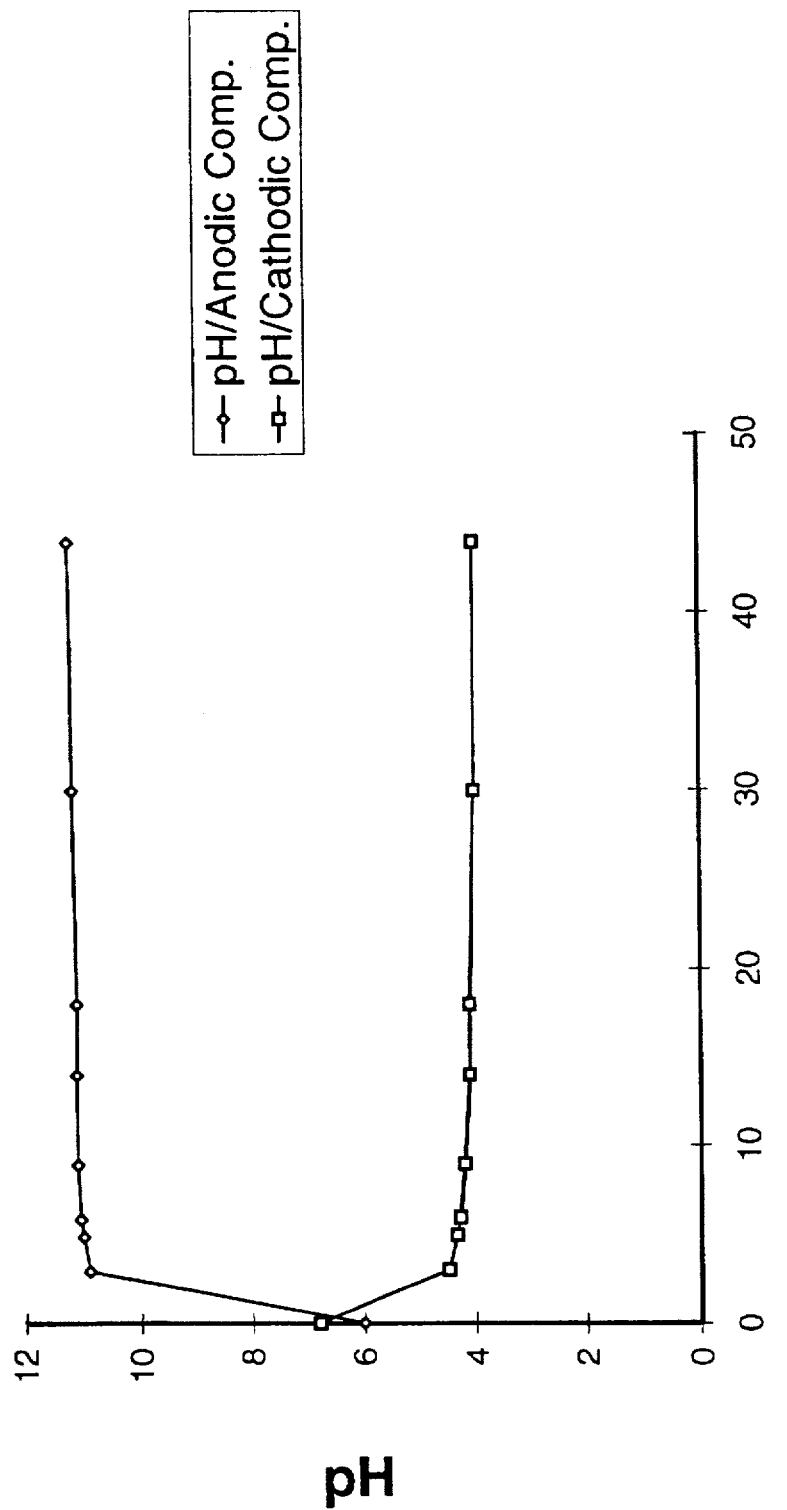
FIG. 7 shows the pH profiles during transport of an equimolar mixture of $K^+$ and $Na^+$.

FIG. 7 shows the pH profiles for the mixed ion $K^+/Na^+$ system. This indicates that charge neutrality is maintained during the transport of ions in one direction, by the migration of protons in the opposite direction. On this basis, the observed change in the ion transport rates observed in FIGS. 4, 5 and 6 is probably due to the change in pH (ie proton depletion) in the anodic compartment. Simply by adding acid (eg 0.1M HCl) to balance this proton depletion the rates of transport observed will change from the dual rates (FIGS. 4, 5 and 6) to a linear transport rate. Standard titre techniques as will be known in the art will suffice to achieve this.

In order to determine the effect of allowing the potential through the conducting polymer membrane to vary a dual potentiostat was constructed which had the capacity to operate as either two independent potentiostats or in a "Master/Slave" (M/S) mode. In the M/S mode, one compartment was held at a constant potential (the "Master") and the potential of the other compartment allowed to vary (the "Slave"). The current applied to the Slave compartment was equal and opposite to that of the Master.

Figure 8:
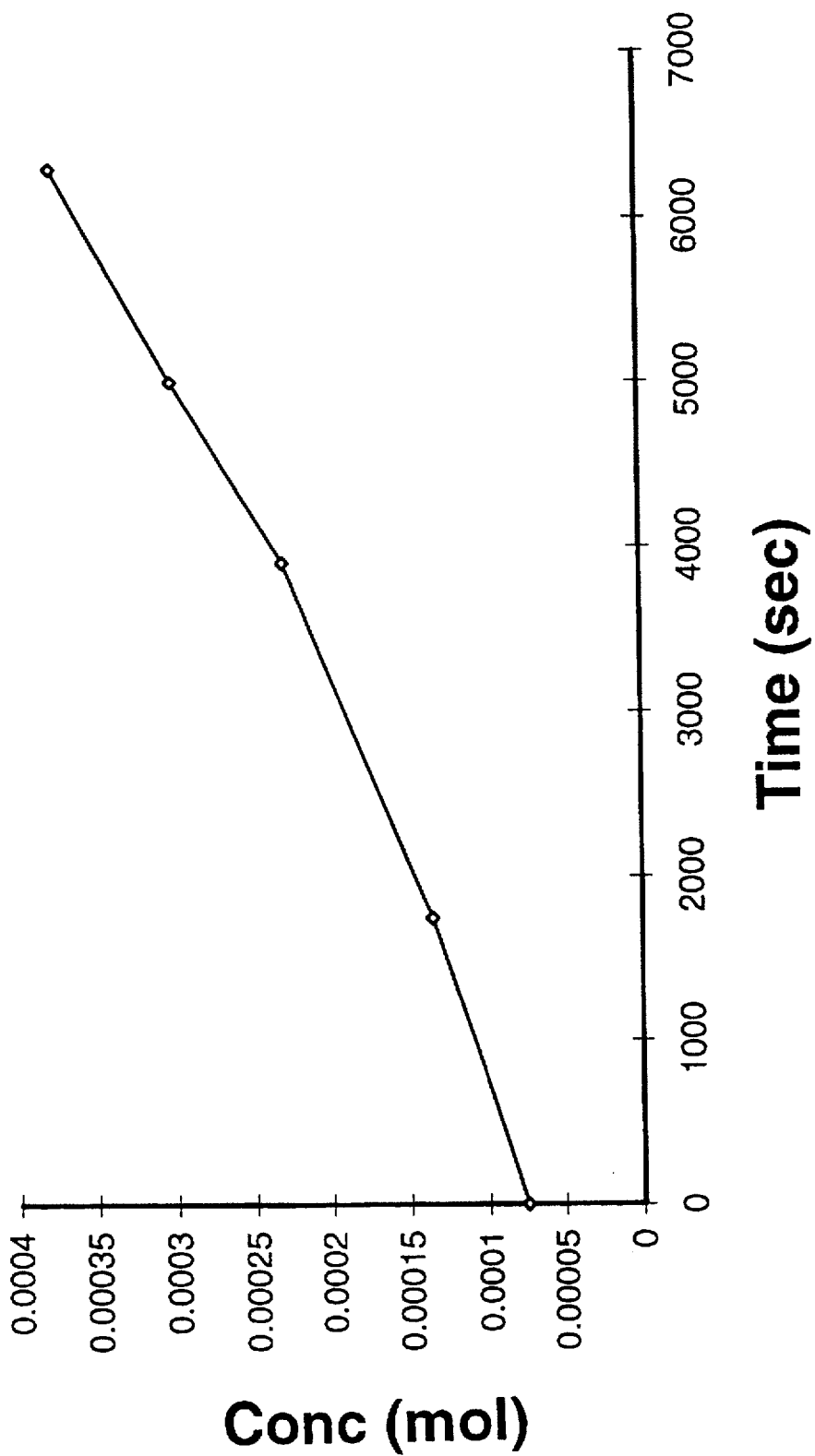
FIG. 8 shows the concentration profile for the transport of $K^+$ ions with the potentiostat operated in a master/slave mode.

The concentration profile for the transport of $K^+$ ions through the membrane, while operating in M/S mode, is shown in FIG. 8. As can be clearly seen the profile was linear with a flux value of $0.5 \times 10^{-8}$ mol/cm$^2$sec. Thus monodirectional transport of ions can also be achieved in the M/S mode with a variation in potential across the membrane.

The electrochemical cell setups as disclosed in the present application therefore provide a means of maximising the transport properties of the membrane and of inducing the mono-directional transport of ions through a conducting membrane. By applying a potential gradient across a conducting polymer membrane monodirectional transport of ions can be effectively achieved.

The ability to switch conducting polymers between conductive and non-conductive states leads to numerous applications in the area of separation technology. As mentioned previously the co-transport of potassium and calcium ions will be of particular use in the wine industry. A further application is seen to be the removal of lithium from geothermal bores. Such mono-directional transport removes these ions through the conducting polymer membrane from the wine/geothermal solutions into a master/standard electrolyte by creation of the potential gradient across the separating conducting polymer membrane.

Figure 9:
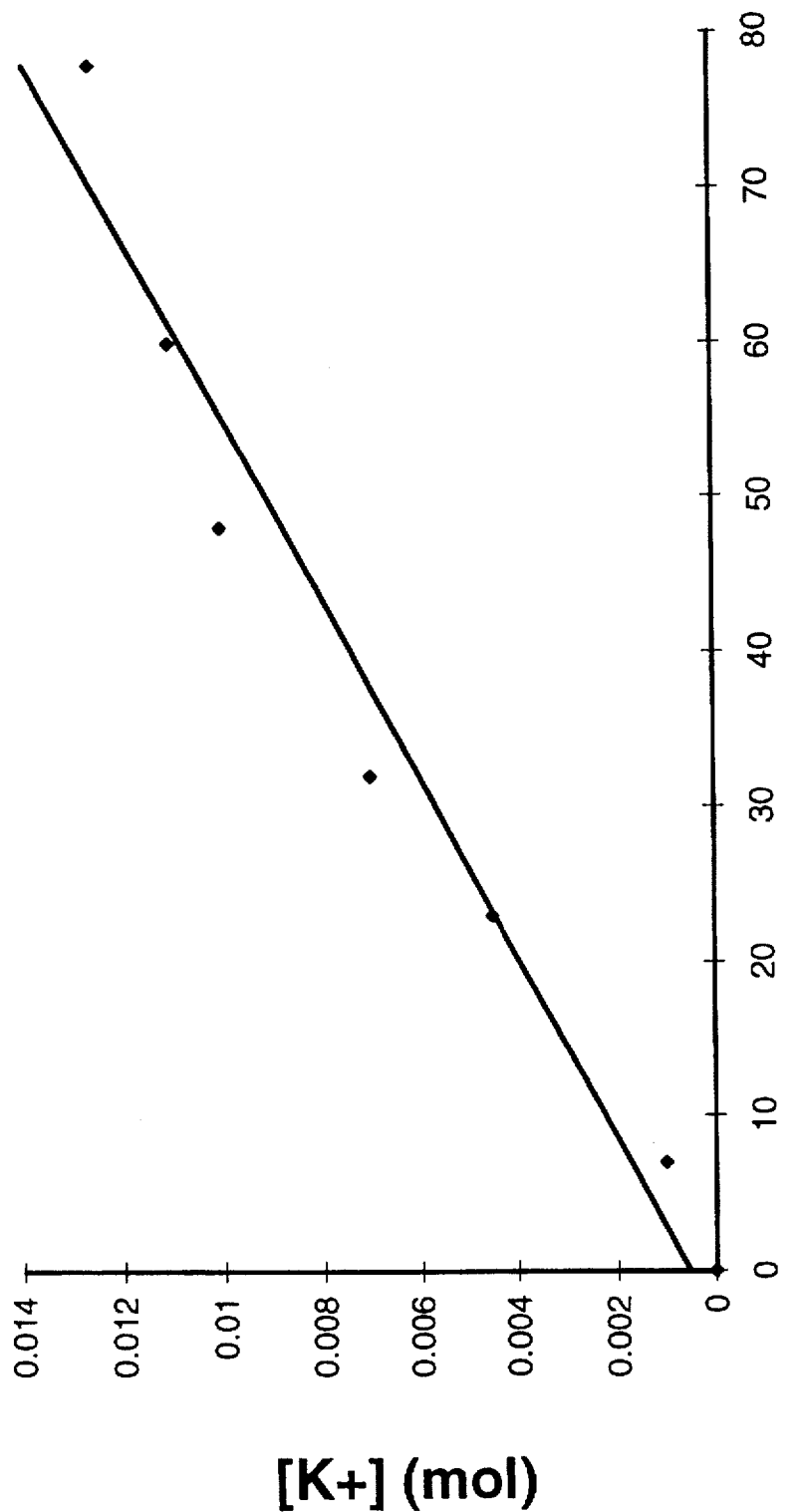
FIG. 9 shows the transport of a number of mono-valent ions through a PPy membrane.

In order to determine the selectivity and transport rates of mono-valent cations, the transport of $Li^+$, $Na^+$, $K^+$, $Rb^+$ and $Cs^+$ through a PPy membrane was studied. A solution comprising 5 ml of each of halide salts of Li, Na, K, Rb and Cs (0.1M), was made up to 100 mL and placed in the cathodic compartment. The anodic compartment comprised $CaCl_2$ (0.1M, 100 mL). As previously described, a potential gradient of +/−400 mV was applied and the rates of transport of the ions analysed by AA. The relative rates of transport of the mono-valent cations are depicted in FIG. 9. As shown in FIG. 9 the relative selectivity of the membrane was $K^+$(100%)$\approx Rb^+$ (98%)>$Cs^+$ (80%)>$Na^+$ (50%) $Li^+$ (15%). The order of selectivity is thought to reflect the selectivity of the sulphonate dopant ion for the various cations. The % uncertainty for the ions used in the transport studies were: Li—3%, Na—1%, K—1%, Rb—2.5%, and Cs—2.5%.

No real effect was observed on the transport rates of the five mono-valent cations depicted in FIG. 9 when the potential gradient was changed from +/−400 mV to +/−700 mV to +/−1000 mV.

The selectivity of the process for mono-valent, divalent and transition metal ions was also studied using solutions containing combinations of these ions. Solutions were prepared and used as the electrolytic solution of the cathodic compartment. The membrane used was a PPy/PTS membrane. A potential gradient was applied in the manner described previously, and the rate of transport determined by the analysis of samples taken from the anionic compartment. The experimental conditions for the transport of the mono-valent ions across the PPy/PTS membrane is as has been described previously herein.

The experimental conditions for the transport of divalent cations across a PPy/PTS membrane are as follows. A solution comprising 5 ml of each of the halide salts of Li, K, Ca, Mg and Ba (0.1M), was made up to 100 ml and placed in the cathodic compartment. The anodic compartment comprised NaCl (0.1M, 100 ml). As previously described a potential gradient of +/−400 mV was applied and the rates of transport of the ions analysed by AA, the results of which are shown in Table 4. The results indicate that monovalent ions generally had a higher transport rate than divalent.

TABLE 4

The AA results (ppm) for the transport of mono and di-valent cations across a PPy/PTS membrane.

| Time (sec) | 0 | 9150 | 15040 | 75500 | 101800 |
|---|---|---|---|---|---|
| [Li] | 0.005 | 0.055 | 0.07 | 0.165 | 0.2 |
| [K] | 1.22 | 5 | 5.55 | 9.2 | 10.05 |
| [Mg] | 0.295 | 0.575 | 0.46 | 1.265 | 1.305 |
| [Ba] | 0.02 | 0.334 | 0.475 | 1.6 | 2.6 |

The experimental conditions used to determine if transition metal ions could be transported across the membrane is as follows. A solution comprising 5 ml of each of the halide salts of Li, K, Co, Cu and Ni (0.1M), was made up to 100 ml and placed in the cathodic compartment. The anodic compartment comprised NaCl (0.1M, 100 ml). A potential gradient of +/–400 mV was applied and the anodic compartment analysed by AA. The results indicated that transition metals were unable to pass through the membrane when the membrane has a constant potential gradient across it.

To determine the applicability of the process in some typical applications, experiments were carried out using wine, geothermal bore water and sheep wool scour as the cathodic electrolytic solutions. In each case the analysis indicated the successful removal of cations from the solutions. Table 5 shows the flux rates obtained in the various media.

Figure 10:
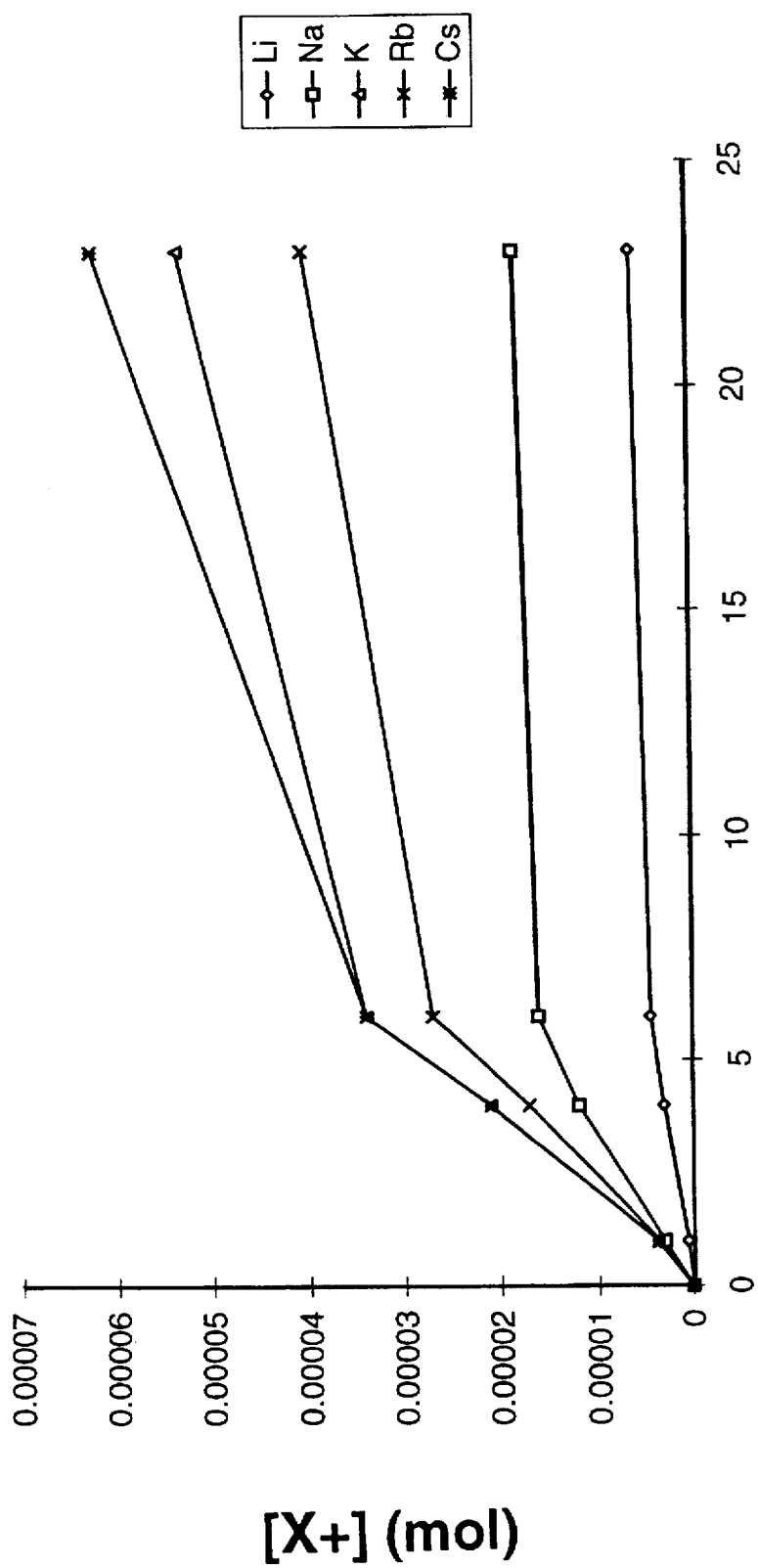
FIG. 10 shows the transport of K$^+$ ions from wool scour through a 4 cm$^2$ PPy membrane.

FIG. 10 shows the transport of $K^+$ ions from sheep wool scour. The calculated flux for $K^+$ ion transport was approximately 1 mol $hr^{-1}$ $m^{-2}$, and the energy consumption was in the order of 0.05 kW hr $m^{-2}$. The procedure for the removal of ions from the sample solutions is similar to that described earlier. A sample of the authentic industrial product (100 ml) was placed in the cathodic compartment and NaCl solution (0.1M, 100 ml) was placed in the anodic. A potential gradient was applied, and samples from the anodic compartment were analysed by AA.

TABLE 5

The Relative Flux Rate for Cations Being Removed From Wine, Geothermal Bore Water and Sheep Scour

| Cathodic Compartment | Cations Fluxes/mol $sec^1 cm^{-2}$ | | |
|---|---|---|---|
| Electrolyte | [K] | [Na] | [Li] |
| Wine | $3 \times 10^{-9}$ | — | — |
| Geothermal Bore Water | — | $2 \times 10^{-9}$ | $4 \times 10^{-11}$ |
| Sheep Scour | $5 \times 10^{-8}$ | — | — |

As will be readily apparent to a person skilled in this particular art the invention of the present application will have wide ranging applicability in a variety of situations where there is a requirement to remove ions from solution. The experimental data disclosed in this application have included wine, geothermal bore water, and sheep scour however the process should not be seen to be limited to such applications. Further alternatives may include, amongst many others, the removal of lithium and/or radioactive caesium from sea water for example.

The foregoing describes the invention including preferred forms thereof. It is to be understood that the scope of the invention is not to be limited to the specific forms described. Alterations and modifications as will be obvious to those skilled in the art are intended to be included within the invention as described without departing from the spirit or scope of the invention as defined in the attached claims.

I claim:

1. A method of inducing mono-directional transport of ions between electrolyte solutions comprising separating the electrolyte solutions with a conducting polymer membrane and creating a potential gradient across said membrane wherein the potential gradient is created by using the conducting polymer membrane as a shared working electrode.

2. The method of claim 1 wherein the potential gradient across the conducting polymer membrane is created via a three electrode system in each electrolyte solution, said three electrode system comprising a reference electrode, a counter electrode, and a shared working electrode, wherein the shared working electrode is the conducting polymer membrane separating the electrolyte solutions.

3. The method of claim 1 wherein the conducting polymer membrane is free-standing.

4. The method of claim 1 wherein the conducting polymer membrane comprises a composite membrane made of a conducting polymer incorporated into either a non-conductive or conductive media.

5. The method of claim 1 wherein the conducting polymer membrane is selected form polypyrrol, polythiophene, polyaceteylene, polyfuran, polyaniline, or polyphenylene or derivatives of these.

6. The method of claim 1 wherein the electrolyte solutions are constantly stirred.

7. The method of claim 1 wherein the potential gradient created across the conducting polymer membrane remains constant.

8. The method of claim 1 wherein the potential gradient created across the conducting polymer membrane is varied.

9. The method of claim 1 wherein the potential gradient created across the conducting polymer membrane is varied by holding one electrolyte solution at a constant potential and allowing the potential in the other electrolyte solution to vary.

10. The method of claim 1 wherein there are more than two electrolyte solutions each separated from each other by conducting polymer membrane and the potential in one solution is held constant while the potential in each of the other solutions is allowed individually to vary.

11. The method of claim 1 wherein there are more than two electrolyte solutions each of which are separated from each other by the conducting polymer membrane.

12. The method of claim 1 wherein the potential gradient across the conducting polymer membrane is up to about 2400 mV.

13. The method of claim 1 when used to remove ions from wine, geothermal bore water, wool scour or sea water.

14. The method of claim 1 wherein the ions transported through the conducting polymer membrane are cations or anions.

15. The method of claim 1 wherein the ions transported through the conducting polymer membrane are cations and are selected from the group consisting of H, Li, Na, K, Rb, Cs, Fr, Be, Mg, Ca, Sr, Ba and Ra.

16. The method of claim 1 wherein the ions transported through the conducting polymer membrane are anions selected from the group consisting of the nitrates, sulphates, halides, phosphates and perchlorates.

17. An apparatus for inducing mono-directional transport of ions between electrolyte solutions, said apparatus comprising container means for holding the electrolyte solutions, a conducting polymer membrane separating the electrolyte solutions and a three electrode system in each electrolyte solution, the three electrode system comprising a reference electrode, a counter electrode, and a shared working electrode and wherein the shared working electrode is the polymer membrane separating the electrolyte solutions.

18. The apparatus according to claim 17 wherein the conducting polymer membrane is free-standing.

19. The apparatus according to claim 17 wherein the polymer membrane is a composite membrane made of a conducting polymer incorporated into either a non-conductive or conductive media.

20. The apparatus according to claim 17 wherein the conducting polymer membrane is selected from polypyrrol, polythiophene, polyaceteylene, polyfuran, polyaniline, or polyphenylene or derivatives of these.

21. The apparatus of claim 17 further including combination pH probes in each electrolyte solution.

22. The apparatus according to claim 17 wherein the counter electrodes are stainless steel, titanium, gold, platinum or carbon counter electrodes.

23. The apparatus according to claim 17 wherein the reference electrode is an Ag/AgCl or SCE electrode.

24. The apparatus according to claim 17 wherein said apparatus comprises more than 2 electrolyte solutions, each said solutions being separated by a conducting polymer membrane and each including said three electrode system.

* * * * *